United States Patent
Onuki

(10) Patent No.: US 12,191,695 B2
(45) Date of Patent: Jan. 7, 2025

(54) CHARGING SYSTEM

(71) Applicant: HONDA MOTOR CO., LTD., Tokyo (JP)

(72) Inventor: Yasumichi Onuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 498 days.

(21) Appl. No.: 17/557,309

(22) Filed: Dec. 21, 2021

(65) Prior Publication Data

US 2022/0216717 A1    Jul. 7, 2022

(30) Foreign Application Priority Data

Jan. 7, 2021 (JP) .................. 2021-001662

(51) Int. Cl.
*H02J 7/06* (2006.01)
*H02J 7/00* (2006.01)
*H02J 7/02* (2016.01)

(52) U.S. Cl.
CPC ........ *H02J 7/00714* (2020.01); *H02J 7/0013* (2013.01); *H02J 7/02* (2013.01)

(58) Field of Classification Search
None
See application file for complete search history.

(56) References Cited

U.S. PATENT DOCUMENTS

| | | | | |
|---|---|---|---|---|
| 4,422,032 A | * | 12/1983 | Kakumoto | ............... H02J 7/02 363/19 |
| 2004/0228055 A1 | * | 11/2004 | Pearson | .................. H02J 7/345 361/93.1 |
| 2013/0234671 A1 | | 9/2013 | Choi | |
| 2013/0285613 A1 | | 10/2013 | Fujita et al. | |
| 2017/0288423 A1 | | 10/2017 | Wu et al. | |

(Continued)

FOREIGN PATENT DOCUMENTS

| CN | 202134923 | 2/2012 |
|---|---|---|
| CN | 202513656 | 10/2012 |

(Continued)

OTHER PUBLICATIONS

Chinese Office Action for Chinese Patent Application No. 202111566031.X mailed May 18. 2024.

(Continued)

*Primary Examiner* — Arun C Williams
(74) *Attorney, Agent, or Firm* — Amin, Turocy & Watson, LLP

(57) ABSTRACT

A charging system includes an AC power source, a plurality of rectifier circuits, a plurality of positive electrode side current cutoff circuits, and a control device. The plurality of rectifier circuits are connected between the AC power source and each of a plurality of battery modules. Each rectifier circuit supplies DC power obtained by rectifying AC power supplied from the AC power source to each battery module. The plurality of positive electrode side current cutoff circuits are connected between each of the plurality of battery modules and each of the plurality of rectifier circuits. Each positive electrode side current cutoff circuit automatically switches between conduction and cutoff of a current between each battery module and each rectifier circuit according to AC power input to each rectifier circuit.

2 Claims, 9 Drawing Sheets

(56) References Cited

U.S. PATENT DOCUMENTS

2022/0085622 A1  3/2022 Onuki
2023/0327536 A1  10/2023 Onuki

FOREIGN PATENT DOCUMENTS

| | | |
|---|---|---|
| CN | 103312041 | 9/2013 |
| CN | 106655319 | 5/2017 |
| CN | 107294145 | 10/2017 |
| CN | 111082492 | 4/2020 |
| JP | 09-215216 | 8/1997 |
| JP | 2011-067021 | 3/2011 |
| JP | 2011-211842 | 10/2011 |
| JP | 2018-201327 | 12/2018 |
| JP | 2022-047050 | 3/2022 |
| KR | 10-2017-0080917 | 7/2017 |
| WO | 2012/098794 | 7/2012 |
| WO | 2022/054367 | 3/2022 |

OTHER PUBLICATIONS

Japanese Notice Of Allowance for Japanese Patent Application No. 2021-001662 mailed Sep. 17, 2024.

* cited by examiner

CHARGING SYSTEM

CROSS-REFERENCE TO RELATED APPLICATION

Priority is claimed on Japanese Patent Application No. 2021-001662, filed Jan. 7, 2021, the content of which is incorporated herein by reference.

BACKGROUND OF THE INVENTION

Field of the Invention

The present invention relates to a charging system.

Description of Related Art

Conventionally, for example, a power supply device that supplies power to a plurality of battery modules connected in series is known (for example, refer to Japanese Unexamined Patent Application, First Publication No. 2011-67021). This power supply device includes a rectifier circuit connected to each of the plurality of battery modules, an AC electric circuit that sequentially connects the plurality of rectifier circuits, and an AC generation circuit that applies an AC voltage to the AC electric circuit.

SUMMARY OF THE INVENTION

In the conventional power supply device described above, a rectifier circuit formed of a combination of a plurality of diodes is included, and thus a leakage current in a reverse direction may increase when a diode having a characteristic of a small voltage in a forward direction is used for loss reduction, and the like. When the leakage current of a rectifier circuit increases, there is a problem that a battery module is discharged and charge amounts of each of a plurality of battery modules become non-uniform.

For such a problem, for example, when a relay having a mechanical contact is added, there are restrictions on a mechanical operation guarantee, and there is a problem that the contact portion is liable to deteriorate due to an inrush current at the time of being turned on or an arc at the time of being turned off. When a photo coupler, an isolated DC-DC converter, or the like is added in response to potentials of each of the plurality of battery modules connected in series being different from each other, there is a problem that a cost required for a device configuration increases.

Aspects of the present invention have been made in consideration of such circumstances, and an object of the present invention is to provide a charging system that can cut off a leakage current while suppressing an increase in cost required for the configuration.

The present invention has adopted the following aspects to solve the problems described above.

(1) A charging system according to one aspect of the present invention is a charging system that charges a plurality of power storage modules that form a power storage device and includes an AC power source, a plurality of rectifiers that are connected between the AC power source and each of the plurality of power storage modules, and supply DC power obtained by rectifying AC power supplied from the AC power source to the plurality of power storage modules, and a plurality of current cutoff units that are connected between each of the plurality of power storage modules and each of the plurality of rectifiers, and automatically switch between conduction and cutoff of a current between the plurality of power storage modules and the plurality of rectifiers according to the AC power input to each of the plurality of rectifiers.

(2) In the aspect of (1) described above, each of the plurality of current cutoff units may include a switch unit that is connected between the power storage module and the rectifier and includes at least one switching element, and a drive unit that is connected between an AC input end of the rectifier and a control terminal of the switch unit and generates a control signal for switching between closing and opening of the switch unit according to the AC power input to the AC input end.

(3) In the aspect of (2) described above, the drive unit may include a capacitor connected to the AC input end, a rectifier circuit connected to the capacitor, and a discharge resistor connected between the rectifier circuit and the switch unit.

According to the aspect of (1) described above, it is possible to suppress an increase in leakage current of a power storage module via a rectifier while suppressing an increase in cost required for a configuration by including a plurality of current cutoff units that automatically switch between conduction and cutoff of a current between a plurality of power storage modules and a plurality of rectifiers according to AC power input to each rectifier.

In a case of the aspect of (2) described above, it is possible to suppress an increase in leakage current of a power storage module via a rectifier while suppressing an increase in cost required for a configuration by including a drive unit that automatically switches between on (conduction) and off (cut off) of a switching element.

In a case of the aspect of (3) described above, it is possible to automatically switch between conduction and cutoff of a current according to the presence or absence of application of AC power. When the AC power is not applied, a switching element is cut off by a discharge of a discharge resistor, and when the AC power is applied, a potential of a control terminal of a switch unit is increased and a switching element is conducted.

DETAILED DESCRIPTION OF THE INVENTION

Hereinafter, a charging system 10 according to the embodiment of the present invention will be described with reference to the accompanying drawings.

Figure 1:
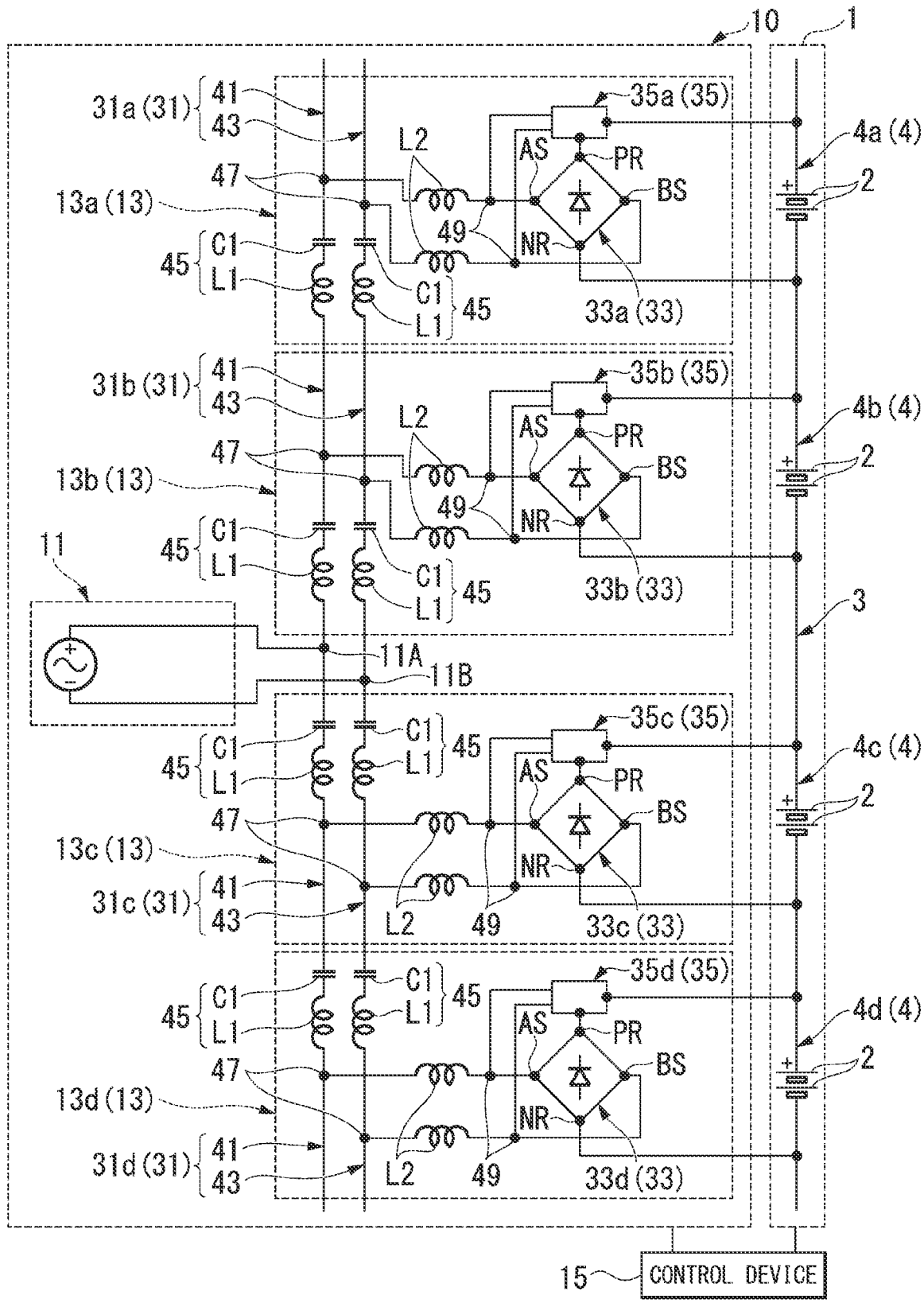
FIG. 1 is a diagram which shows a configuration of a charging system in an embodiment of the present invention.

FIG. 1 is a diagram which shows a configuration of the charging system 10 in the embodiment.

The charging system 10 according to the present embodiment is mounted in, for example, a vehicle such as an electric vehicle. The charging system 10 is connected to a power storage device mounted in the vehicle. The electric vehicle is an electric vehicle, a hybrid vehicle, a fuel cell vehicle, or the like. An electric vehicle is driven by a battery as a power source. A hybrid vehicle is driven by a battery and an internal combustion engine as power sources. A fuel cell vehicle is driven by a fuel cell as a power source.

As shown in FIG. 1, the power storage device connected to the charging system 10 is, for example, a high-voltage battery 1 which is a power source of the vehicle. The battery 1 includes, for example, a string 3 formed of a plurality of cells 2 connected in series, and positive electrode terminals and negative electrode terminals at both ends of the string 3. The battery 1 includes a plurality of battery modules 4 formed by dividing the string 3 into a plurality of sub-strings in series. The plurality of battery modules 4 are, for example, a first battery module 4a, a second battery module 4b, a third battery module 4c, and a fourth battery module 4d formed by dividing the string 3 into four parts. For example, the first battery module 4a, the second battery module 4b, the third battery module 4c, and the fourth battery module 4d are sequentially connected in series.

The charging system 10 includes an AC power source 11, a plurality of circuit modules 13, and a control device 15.

Figure 2:
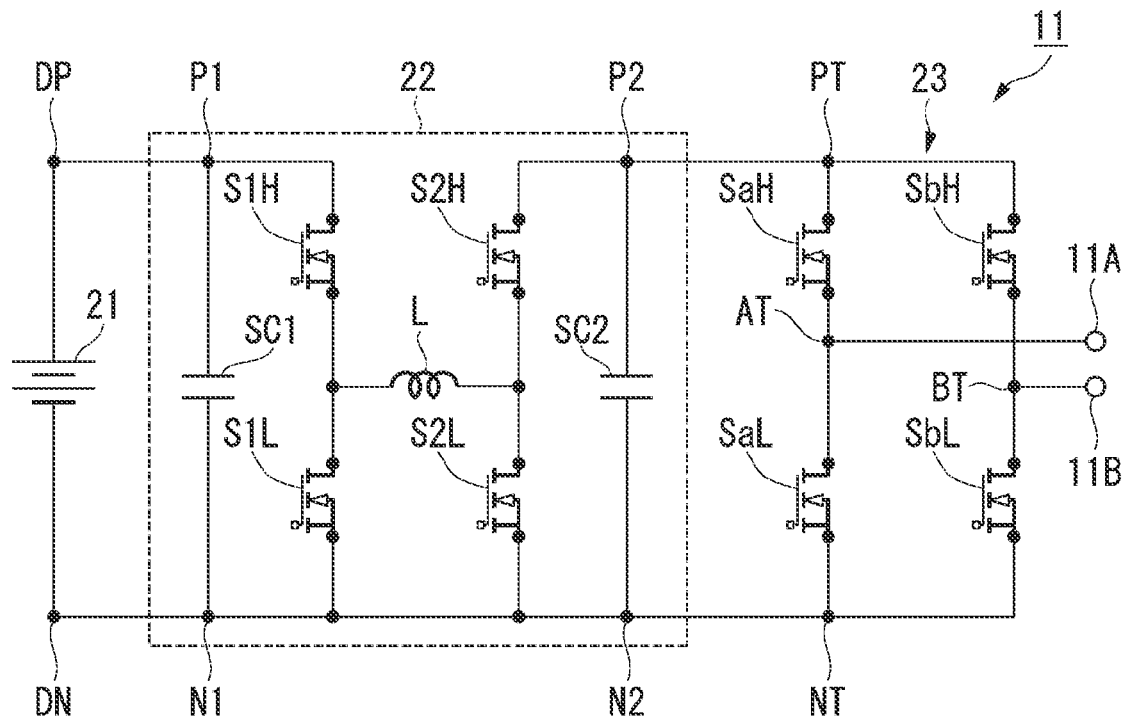
FIG. 2 is a diagram which shows a configuration of an AC power source of the charging system in the embodiment of the present invention.

FIG. 2 is a diagram which shows a configuration of an AC power source 11 of the charging system 10 in the embodiment.

As shown in FIG. 2, the AC power source 11 includes a DC power supply 21, a first power conversion unit 22, and a second power conversion unit 23.

The DC power supply 21 is, for example, a solar cell or the like.

The first power conversion unit 22 includes, for example, a DC-DC converter that performs two types of power conversion of step-up and step-down. The first power conversion unit 22 includes a first positive electrode terminal P1, a first negative electrode terminal N1, a second positive electrode terminal P2, and a second negative electrode terminal N2.

The first positive electrode terminal P1 and the first negative electrode terminal N1 of the first power conversion unit 22 are connected to a positive electrode terminal DP and a negative electrode terminal DN of the DC power supply 21. The second positive electrode terminal P2 and the second negative electrode terminal N2 of the first power conversion unit 22 are connected to a positive electrode terminal PT and a negative electrode terminal NT of the second power conversion unit 23.

The first power conversion unit 22 includes, for example, a switching element of a low-side arm and a high-side arm paired using two phases, and a reactor. The switching element is a transistor such as a metal oxide semiconductor field effect transistor (MOSFET) or an insulated gate bipolar transistor (IGBT), and is, for example, an N channel type MOSFET. The reactor is a choke coil L.

Each transistor may include a rectifying element. The rectifying element is a diode connected in parallel to each transistor. The rectifying element is, for example, a freewheel diode that is connected between a drain and a source of the MOSFET from the source to the drain in a forward direction.

The first power conversion unit 22 includes high-side arm and low-side arm first-phase transistors S1H and S1L paired using a first phase, and high-side arm and low-side arm second-phase transistors S2H and S2L paired using a second phase.

A drain of the high-side arm first phase transistor S1H is connected to the first positive electrode terminal P1. A drain of the high-side arm second phase transistor S2H is connected to the second positive electrode terminal P2. A source of the low-side arm first phase transistor S1L is connected to the first negative electrode terminal N1. A source of the low-side arm second phase transistor S2L is connected to the second negative electrode terminal N2. A source of the high-side arm first phase transistor S1H and a drain of the low-side arm first phase transistor S1L are connected to first ends at both ends of the choke coil L. A source of the high-side arm second phase transistor S2H and a drain of the low-side arm second phase transistor S2L are connected to second ends at both ends of the choke coil L.

The first power conversion unit 22 includes a first smoothing capacitor SC1 connected between the first positive electrode terminal P1 and the first negative electrode terminal N1 and a second smoothing capacitor SC2 connected between the second positive electrode terminal P2 and the second negative electrode terminal N2. The first smoothing capacitor SC1 and the second smoothing capacitor SC2 smooth voltage fluctuations generated by an on or off switching operation of each of the transistors S1H, S1L, S2H, and S2L.

The first power conversion unit 22 switches between on (conduction) and off (cut off) of each of the transistors S1H, S1L, S2H, and S2L based on a gate signal which is a switching command input to a gate of each of the transistors S1H, S1L, S2H, and S2L.

The first power conversion unit 22 steps up power input from a DC power supply 21 to the first positive electrode terminal P1 and the first negative electrode terminal N1 at the time of stepping up a voltage, and outputs the stepped-up power from the second positive electrode terminal P2 and the second negative electrode terminal N2. The first power conversion unit 22 maintains an on state (conduction) of the high-side arm first phase transistor S1H and an off state (cut off) of the low-side arm first phase transistor S1L at the time of stepping up a voltage.

The first power conversion unit 22 accumulates magnetic energy by direct current excitation of the reactor (choke coil L) when the high-side arm second phase transistor S2H is turned off (cut off) and the low-side arm second phase transistor S2L is turned on (conduction). The first power conversion unit 22 causes a voltage higher than those of the first positive electrode terminal P1 and the first negative electrode terminal N1 to be generated in the second positive electrode terminal P2 and the second negative electrode terminal N2 by superimposing an induced voltage generated by the magnetic energy of the reactor (choke coil L) when the high-side arm second phase transistor S2H is turned on (conduction) and the low-side arm second phase transistor S2L is turned off (cut off) and the voltage applied to the first positive electrode terminal P1 and the first negative electrode terminal N1.

The first power conversion unit 22 steps down a voltage of the power input from the first positive electrode terminal P1 and the first negative electrode terminal N1 at the time of stepping down a voltage, and outputs the power whose voltage is stepped down from the second positive electrode terminal P2 and the second negative electrode terminal N2. The first power conversion unit 22 maintains an on state (conduction) of the high-side arm second phase transistor S2H and an off state (cut off) of the low-side arm second phase transistor S2L at the time of stepping down a voltage.

The first power conversion unit 22 accumulates magnetic energy by direct current excitation of the reactor (choke coil L) when the high-side arm first phase transistor S1H is turned on (conduction) and the low-side arm first phase transistor S1L is turned off (cut off). The first power conversion unit 22 causes a voltage lower than that of the first positive electrode terminal P1 and the first negative electrode terminal N1 to be generated in the second positive electrode terminal P2 and the second negative electrode terminal N2 by stepping down an induced voltage generated by the magnetic energy of the reactor (choke coil L) when the high-side arm first phase transistor S1H is turned off (cut off) and the low-side arm first phase transistor S1L is turned on (conduction).

The second power conversion unit 23 includes, for example, an inverter that converts DC power input from the first power conversion unit 22 into AC power and outputs it to an AC electric circuit 12.

The second power conversion unit 23 includes, for example, a bridge circuit formed of a plurality of switching elements that are bridge-connected by two phases, an A phase and a B phase. The switching element is a transistor such as a MOSFET or an IGBT, and is, for example, an N channel-type MOSFET. Each transistor may include a rectifying element. The rectifying element is a diode connected in parallel to each transistor. The rectifying element is, for example, a freewheel diode that is connected between the drain and the source of the MOSFET in a forward direction from a source to a drain.

The second power conversion unit 23 includes high-side arm and low-side arm A-phase transistors SaH and SaL that form a pair using the A phase, and high-side arm and low-side arm B-phase transistors SbH and SbL that form a pair using the B phase.

Each drain of the high-side arm A-phase transistor SaH and the high-side arm B-phase transistor SbH is connected to the positive electrode terminal PT. Each source of the low-side arm A-phase transistor SaL and the low-side arm B-phase transistor SbL is connected to the negative electrode terminal NT. The source of the high-side arm A-phase transistor SaH and the drain of the low-side arm A-phase transistor SaL are connected to an A-phase terminal AT. The source of the high-side arm B-phase transistor SbH and the drain of the low-side arm B-phase transistor SbL are connected to a B-phase terminal BT.

The second power conversion unit 23 switches between on (conduction) and off (cut off) of a transistor pair of each phase based on a gate signal which is a switching command input to a gate of each transistor SaH, SaL, SbH, or SbL. The second power conversion unit 23 converts DC power input from the positive electrode terminal PT and the negative electrode terminal NT into single-phase AC power and outputs it from the A-phase terminal AT and the B-phase terminal BT. The A-phase terminal AT of the second power conversion unit 23 is connected to an A-phase terminal 11A of the AC power source 11, and the B-phase terminal BT of the second power conversion unit 23 is connected to a B-phase terminal 11B of the AC power source 11.

The AC power source 11 supplies the same current (power) to each battery module 4 of the battery 1, for example, when an alternating current having a frequency close to a resonance frequency of an AC electric circuit 31 (a resonance electric circuit) to be described below is generated.

As shown in FIG. 1, the plurality of circuit modules 13 are connected between the AC power source 11 and each of the plurality of battery modules 4. The number of the plurality of circuit modules 13 is the same as the number of the plurality of battery modules 4. The plurality of circuit modules 13 are, for example, a first circuit module 13a, a second circuit module 13b, a third circuit module 13c, and a fourth circuit module 13d.

For example, the first battery module 4a and the first circuit module 13a are integrally connected, the second battery module 4b and the second circuit module 13b are integrally connected, the third battery module 4c and the third circuit module 13c are integrally connected, and the fourth battery module 4d and the fourth circuit module 13d are integrally connected. Each battery module 4 and each circuit module 13 are connected by, for example, a bus bar (not shown) having an insulating coating. The plurality of circuit modules 13 are sequentially connected from the AC power source 11 by wiring (not shown). For example, the second circuit module 13b and the first circuit module 13a are sequentially connected from the AC power source 11, and the third circuit module 13c and the fourth circuit module 13d are sequentially connected from the AC power source 11.

As shown in FIG. 1, each of the plurality of circuit modules 13 includes an AC electric circuit 31, a rectifier circuit 33, and a positive electrode side current cutoff circuit 35. For example, the first circuit module 13a includes a first AC electric circuit 31a, a first rectifier circuit 33a, and a first positive electrode side current cutoff circuit 35a. The second circuit module 13b includes a second AC electric circuit 31b, a second rectifier circuit 33b, and a second positive electrode side current cutoff circuit 35b. The third circuit module 13c includes a third AC electric circuit 31c, a third rectifier circuit 33c, and a third positive electrode side current cutoff circuit 35c. The fourth circuit module 13d includes a fourth AC electric circuit 31d, a fourth rectifier circuit 33d, and a fourth positive electrode side current cutoff circuit 35d.

Each AC electric circuit 31 includes an A-phase electric circuit 41 directly or indirectly connected to the A-phase terminal 11A of the AC power source 11 and a B-phase electric circuit 43 directly or indirectly connected to the B-phase terminal 11B of the AC power source 11. Each of the A-phase electric circuit 41 and the B-phase electric circuit 43 includes an LC row 45 of a first capacitor C1 and a first reactor L1 connected in series on an input side of AC power, and a second reactor L2.

The second reactor L2 is connected between a first connection point 47 provided from the input side of AC power via the LC row 45 in the AC electric circuit 31 and a second connection point 49 on the rectifier circuit 33 side.

The second connection point 49 is connected to the second reactor L2, the rectifier circuit 33, and the positive electrode side current cutoff circuit 35.

A combination of a combined capacitance of capacitors and a combined inductance of inductors of the AC electric circuit 31 in each of the plurality of circuit modules 13 (for example, a product of the combined capacitance and the combined inductance) may be an appropriate combination. For example, when the product (LC product) of the combined capacitance and the combined inductance of resonance electric circuits of each stage corresponding to each battery module 4 of the battery 1 is the same, a current gain for each battery module 4 is the same, and the same current (power) is uniformly supplied to each battery module 4.

For example, when a first LC product for the first battery module 4a, a second LC product for the second battery module 4b, a third LC product for the third battery module 4c, and a fourth LC product for the fourth battery module 4d are all the same, the same current (power) is uniformly supplied to each of the battery modules 4a, 4b, 4c, and 4d. For example, each LC product is a product of the combined capacitance and the combined inductance of capacitors and reactors other than the second reactor L2 in each electric circuit from the AC power source 11 to each rectifier circuit 33.

The first LC product is a product of the combined capacitance and the combined inductance of a first capacitor C1 and a first reactor L1 of the first circuit module 13a indirectly connected to the AC power source 11 via the second circuit module 13b, and a first capacitor C1 and a first reactor L1 of the second circuit module 13b.

The second LC product is a product of the combined capacitance and the combined inductance of the first capacitor C1 and the first reactor L1 of the second circuit module 13b directly connected to the AC power source 11.

The third LC product is a product of the combined capacitance and the combined inductance of a first capacitor C1 and a first reactor L1 of the third circuit module 13c directly connected to the AC power source 11.

The fourth LC product is a product of the combined capacitance and the combined inductance of a first capacitor C1 and a first reactor L1 of a fourth circuit module 13d indirectly connected to the AC power source 11 via the third circuit module 13c, and the first capacitor C1 and the first reactor L1 of the third circuit module 13c.

Each rectifier circuit 33 of the plurality of circuit modules 13 is connected between the AC electric circuit 31 and a corresponding battery module 4 in the battery 1. In each of the plurality of circuit modules 13, a second connection point 49 of the A-phase electric circuit 41 of the AC electric circuit 31 is connected to an A-phase terminal AS of the rectifier circuit 33. A second connection point 49 of the B-phase electric circuit 43 of the AC electric circuit 31 is connected to a B-phase terminal BS of the rectifier circuit 33.

Figure 3:
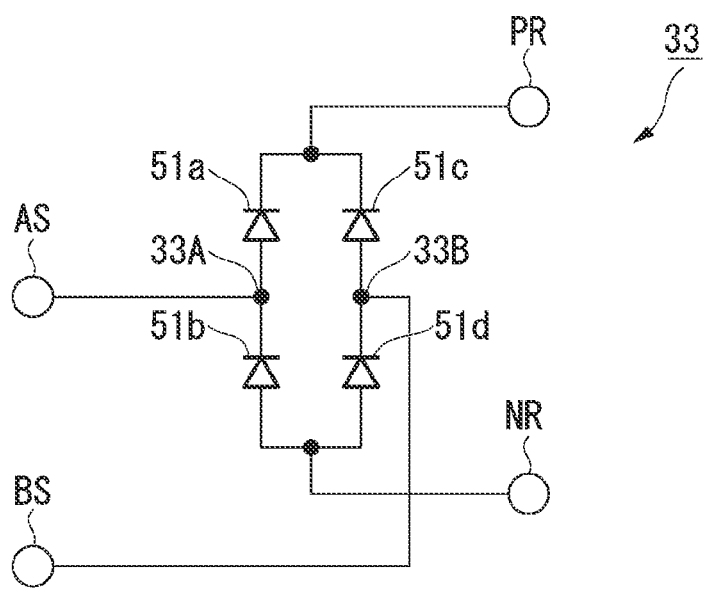
FIG. 3 is a diagram which shows a configuration of a rectifier of the charging system in the embodiment of the present invention.

FIG. 3 is a diagram which shows a configuration of the rectifier circuit 33 of the charging system 10 in the embodiment.

As shown in FIG. 3, the rectifier circuit 33 includes, for example, a bridge circuit formed of a plurality of diodes that are bridge-connected in two rows of a first row and a second row.

The rectifier circuit 33 is, for example, a full-wave rectifier circuit. The rectifier circuit 33 includes a first diode 51a and a second diode 51b connected in the forward direction in the first row, and a third diode 51c and a fourth diode 51d connected in the forward direction in the second row.

A connection point 33A of an anode of the first diode 51a and a cathode of the second diode 51b is connected to the A-phase terminal AS. A connection point 33B of an anode of the third diode 51c and a cathode of the fourth diode 51d is connected to the B-phase terminal BS.

Each cathode of the first diode 51a and the third diode 51c is connected to a positive electrode terminal PR. Each anode of the second diode 51b and the fourth diode 51d is connected to the negative electrode terminal NR. The positive electrode terminal PR and the negative electrode terminal NR of the rectifier circuit 42 are connected to a positive electrode end and a negative electrode end of a corresponding battery module 4 in the battery 1.

The rectifier circuit 33 full-wave rectifies AC power input from the A-phase terminal AS and the B-phase terminal BS, and outputs the rectified DC power from the positive electrode terminal PR and negative electrode terminal NR.

Figure 4:
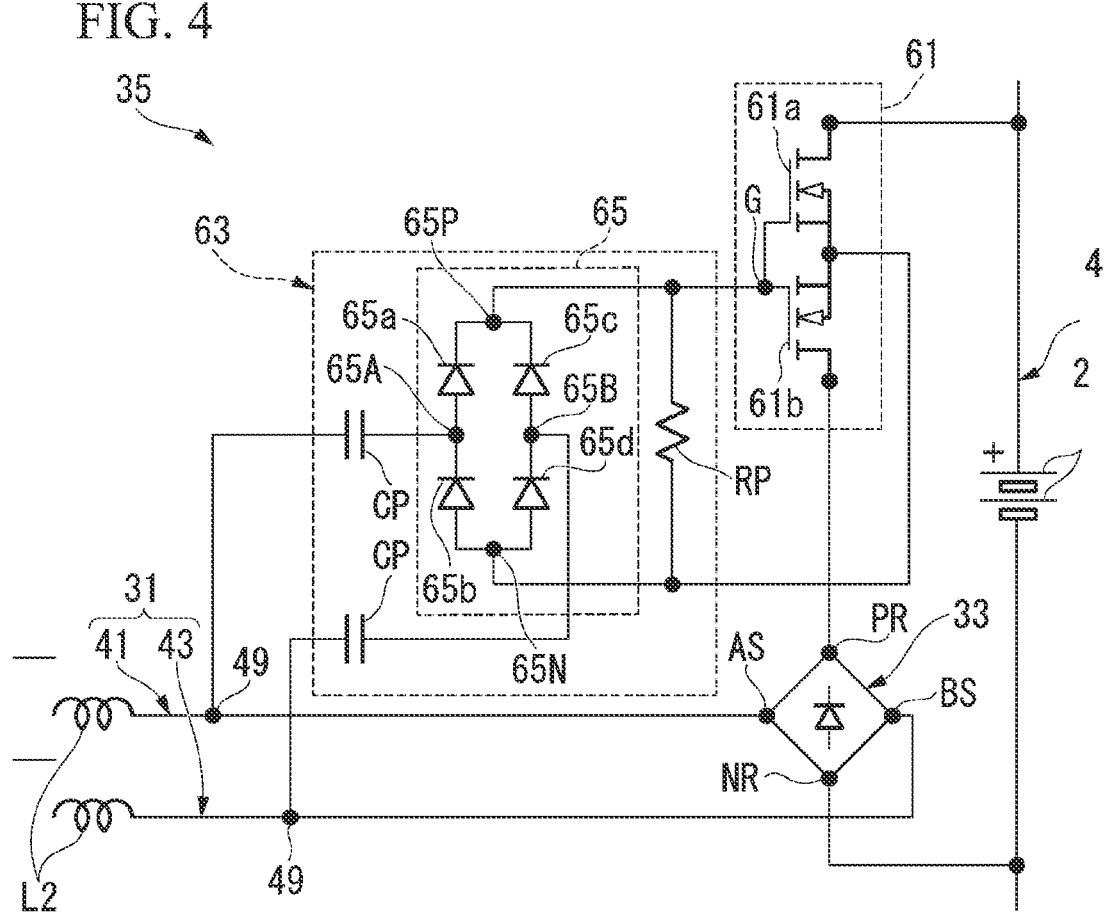
FIG. 4 is a diagram which shows a configuration of a positive electrode-side current cutoff circuit of the charging system in the embodiment of the present invention.

FIG. 4 is a diagram which shows a configuration of the positive electrode side current cutoff circuit 35 of the charging system 10 in the embodiment.

As shown in FIG. 4, each positive electrode side current cutoff circuit 35 of the plurality of circuit modules 13 is connected between the rectifier circuit 33 and the positive electrode end of a corresponding battery module 4 in the battery 1. The positive electrode side current cutoff circuit 35 includes a positive electrode side switch unit 61 and a positive electrode side switch drive unit 63.

The positive electrode side switch unit 61 is connected between a positive electrode terminal PR of the rectifier circuit 33 and the positive electrode end of a corresponding battery module 4 in the battery 1. The positive electrode side switch unit 61 is, for example, a bidirectional switch formed of two switching elements. The switching element is a transistor such as a MOSFET or an IGBT, and is, for example, an N channel type MOSFET. Each transistor may have a rectifying element. The rectifying element is a diode connected in parallel to each transistor. The rectifying element is, for example, a freewheel diode that is connected between the drain and source of the MOSFET in the forward direction from a source to a drain.

The positive electrode side switch unit 61 includes a positive electrode side first transistor 61a and a positive electrode side second transistor 61b connected in anti-series.

Gates G of the positive electrode side first transistor 61a and the positive electrode side second transistor 61b are connected to the positive electrode end of the positive electrode side switch drive unit 63 (for example, the connection point 65P of a positive electrode side rectifier circuit 65 to be described below). Sources of the positive electrode side first transistor 61a and the positive electrode side second transistor 61b are connected to the negative electrode end of the positive electrode side switch drive unit 63 (for example, a connection point 65N of the positive electrode side rectifier circuit 65 to be described below). A drain of the positive electrode side first transistor 61a is connected to the positive electrode end of a corresponding battery module 4 in the battery 1. A drain of the positive electrode side second transistor 61b is connected to the positive electrode terminal PR of the rectifier circuit 33.

The positive electrode side switch unit 61 switches between on (conduction) and off (cut off) of the positive electrode side first transistor 61a and the positive electrode side second transistor 61b based on a gate signal, which is a switching command based on a voltage applied from the positive electrode side switch drive unit 63 between the gate and the source of each of the positive electrode side first transistor 61a and the positive electrode side second transistor 61b. The positive electrode side switch unit 61 switches between conduction and cutoff of a current between each battery module 4 and the rectifier circuit 33 according to on (conduction) or off (cut off) of the positive electrode side first transistor 61a and the positive electrode side second transistor 61b.

The positive electrode side switch drive unit 63 includes two positive electrode side capacitors CPs for DC insulation, a positive electrode side rectifier circuit 65, and a positive electrode side resistor RP for discharge.

The two positive electrode side capacitors CPs are connected to the second connection point 49 of each of the A-phase electric circuit 41 and the B-phase electric circuit 43 of the AC electric circuit 31.

The positive electrode side rectifier circuit 65 includes, for example, a bridge circuit formed of a plurality of diodes that are bridge-connected in two rows of the first row and the second row.

The positive electrode side rectifier circuit 65 is, for example, a full-wave rectifier circuit. The positive electrode side rectifier circuit 65 includes a positive electrode side first diode 65a and a positive electrode side second diode 65b connected in the forward direction in the first row, and a positive electrode side third diode 65c and a positive electrode side fourth diode 65d connected in the forward direction in the second row.

A connection point (an A-phase connection point) 65A between an anode of the positive electrode side first diode 65a and a cathode of the positive electrode side second diode 65b is connected to a second connection point 49 of the A-phase electric circuit 41 via the positive electrode side capacitor CP. A connection point (a B-phase connection point) 65B between an anode of the positive electrode side third diode 65c and a cathode of the positive electrode side fourth diode 65d is connected to a second connection point 49 of the B-phase electric circuit 43 via the positive electrode side capacitor CP.

A connection point 65P between cathodes of the positive electrode side first diode 65a and the positive electrode side third diode 65c is connected to gates G of the transistors 61a and 61b of the positive electrode side switch unit 61. A connection point 65N between anodes of the positive electrode side second diode 65b and the positive electrode side fourth diode 65d is connected to sources of the transistors 61a and 61b of the positive electrode side switch unit 61.

The positive electrode side rectifier circuit 65 full-wave rectifies AC power input from the A-phase electric circuit 41 and the B-phase electric circuit 43 to the A-phase connection point 65A and the B phase connection point 65B, and outputs the rectified DC power from the connection point 65P and the connection point 65N.

The positive electrode side resistor RP is connected between the connection point 65P and the connection point 65N of the positive electrode side rectifier circuit 65.

The positive electrode side switch drive unit 63 automatically switches between conduction and cutoff of a current of the positive electrode side switch unit 61 according to AC power input from the A-phase electric circuit 41 and the B-phase electric circuit 43 to the rectifier circuit 33.

First, in the positive electrode side switch drive unit 63, when the AC power is not applied to the AC electric circuit 31, the positive electrode side resistor RP for discharge discharges charges between the gates and the sources of the transistors 61a and 61b of the positive electrode side switch unit 61, and thereby each of the transistors 61a and 61b is put into a cut-off state, and a leakage current of the battery module 4 via the rectifier circuit 33 becomes extremely small.

When the AC power source 11 is activated and AC power is applied from the AC electric circuit 31 to the positive electrode side switch drive unit 63, only an AC component is input to the positive electrode side rectifier circuit 65 via the positive electrode side capacitor CP. When capacitance between the gates and the sources of the transistors 61a and 61b of the positive electrode side switch unit 61 is charged with the DC power rectified by the positive electrode side rectifier circuit 65, and a gate-source potential becomes sufficiently high, each of the transistors 61a and 61b is conduced, and the DC power generated by the rectifier circuit 33 is used to charge the battery module 4.

When the AC power source 11 is stopped and AC power of the AC electric circuit 31 is cut off, the transistors 61a and 61b of the positive electrode side switch unit 61 are put into the cut-off state again, and a leakage current of the battery module 4 through the rectifier circuit 33 becomes extremely small.

Figure 5:
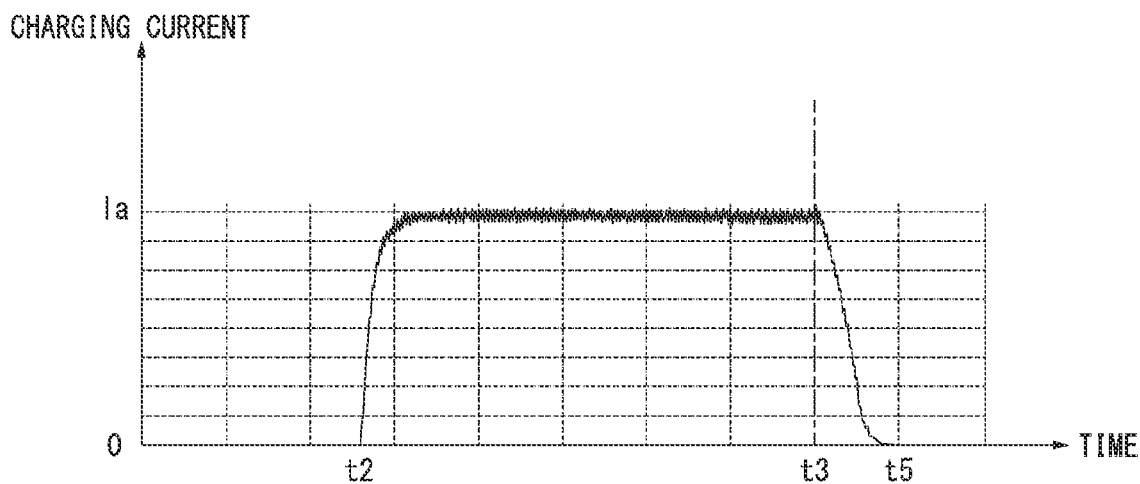
FIG. 5 is a diagram which shows an example of a change in each of a charging current, a source-gate potential, and an AC voltage amplitude in the charging system of the embodiment of the present invention.
Figure 5:
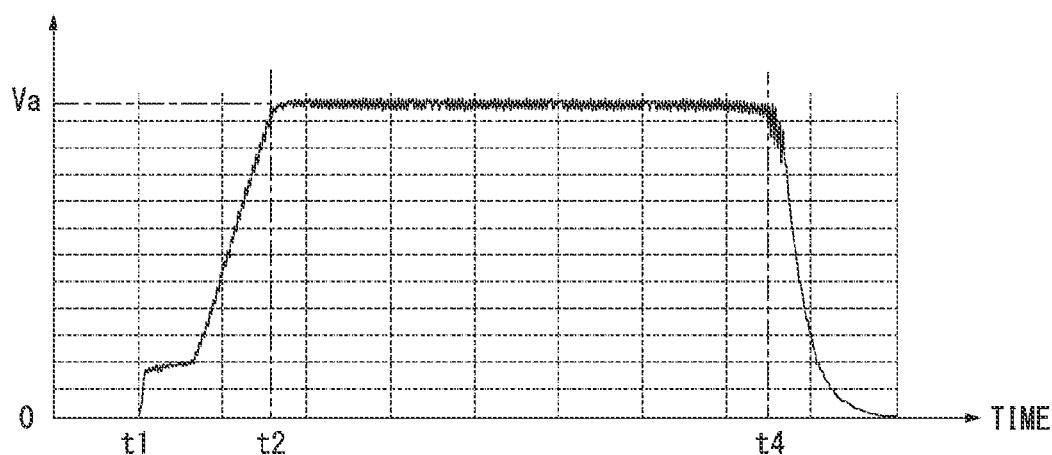
Figure 5:
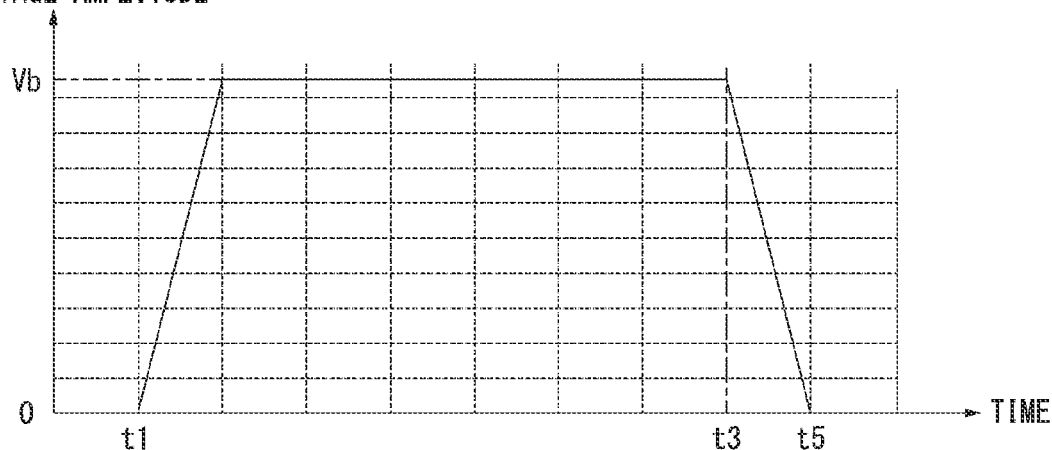

FIG. 5 is a diagram which shows an example of changes in each of a charging current, a source-gate potential, and an AC voltage amplitude in the charging system 10 of the embodiment.

As shown in FIG. 5, as an amplitude of an AC voltage increases, for example, after a time t1, a potential between the source and the gate of each of the transistors 61a and 61b of the positive electrode side switch unit 61 changes in an increasing tendency.

Then, as shown after a time t2, after the amplitude of the AC voltage reaches a predetermined amplitude Vb and the potential between the source and the gate of each of the transistors 61a and 61b reaches a predetermined potential Va, each of the transistors 61a and 61b of the positive electrode side switch unit 61 is turned into a conduction state, and a predetermined charging current Ia flows through the battery module 4.

Then, as shown after a time t3, the amplitude of the AC voltage decreases from the predetermined amplitude Vb, such that the charging current of the battery module 4 decreases from the predetermined charging current Ia. Along with this, as shown after a time t4, the potential between the source and the gate of each of the transistors 61a and 61b drops from the predetermined potential Va.

Then, as shown at a time t5, the amplitude of the AC voltage and the charging current of the battery module 4 reach zero, the potential between the source and the gate of each of the transistors 61a and 61b falls, and each of the transistors 61a and 61b of the positive electrode side switch unit 61 is put into the cut-off state.

As described above, by applying the AC power, each of the transistors 61a and 61b is automatically conduced, and each of the transistors 61a and 61b is automatically put into the cut-off state by stopping the AC power.

As shown in FIG. 1, the control device 15 controls an operation of the charging system 10. For example, the control device 15 is a software functional unit that functions by a processor such as a central processing unit (CPU) executing a predetermined program. The software functional unit is an electronic control unit (ECU) that includes a processor such as a CPU, a read only memory (ROM) for storing a program, a random access memory (RAM) for temporarily storing data, and an electronic circuit such as a timer. At least a part of the control device 15 may also be an integrated circuit such as a large scale integration (LSI).

For example, the control device 15 sets a timing to drive each switching element of the AC power source 11 to be turned on (conduction) or off (cut off), and generates a gate signal for actually driving each switching element to be turned on (conduction) or off (cut off).

As described above, the charging system 10 of the embodiment includes the positive electrode side current cutoff circuit 35 that automatically switches between the conduction and the cut off of a current between the battery module 4 and the rectifier circuit 33 according to the AC power input to the rectifier circuit 33, and thereby it is possible to suppress an increase in leakage current of the battery module 4 via the rectifier circuit 33 while suppressing an increase in cost required for the configuration.

The positive electrode side current cutoff circuit 35 includes the positive electrode side switch drive unit 63 that automatically switches between on (conduction) and off (cut off) of each of the transistors 61a and 61b of the positive electrode side switch unit 61, and thereby, for example, it is possible to suppress an increase in cost required for the configuration as compared with a case of adding a photo coupler, an isolated DC-DC converter, or the like.

The positive electrode side switch drive unit 63 can automatically switch between the conduction and the cut off of the current of the positive electrode side switch unit 61 according to the presence or absence of application of AC power. When the AC power is not applied, each of the transistors 61a and 61b is cut off by discharge of the positive electrode side resistor RP, and, when the AC power is applied, the gate-source potential of each of the transistors 61a and 61b increases and each of the transistors 61a and 61b is conduced.

MODIFIED EXAMPLE

In the following description, modified examples of the embodiment will be described. The same parts as those in the embodiment described above will be denoted by the same reference numerals, and the description thereof will be omitted or simplified.

FIRST MODIFIED EXAMPLE

In the embodiment described above, each of the plurality of circuit modules 13 includes a positive electrode side current cutoff circuit 35 between the rectifier circuit 33 and the positive electrode end of the battery module 4, but the present invention is not limited to this.

Figure 6:
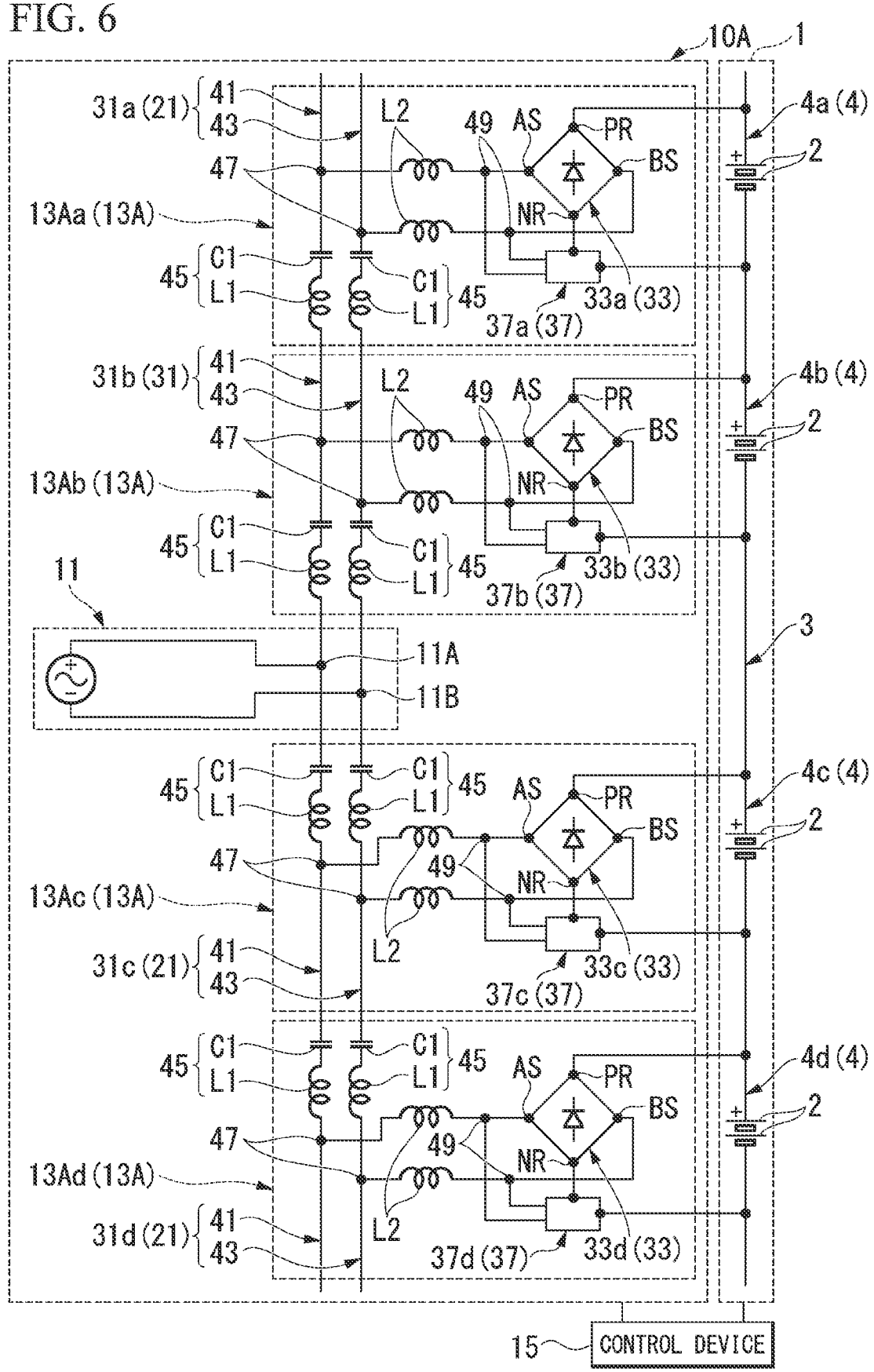
FIG. 6 is a diagram which shows a configuration of a charging system in a first modified example of the embodiment of the present invention.
Figure 7:
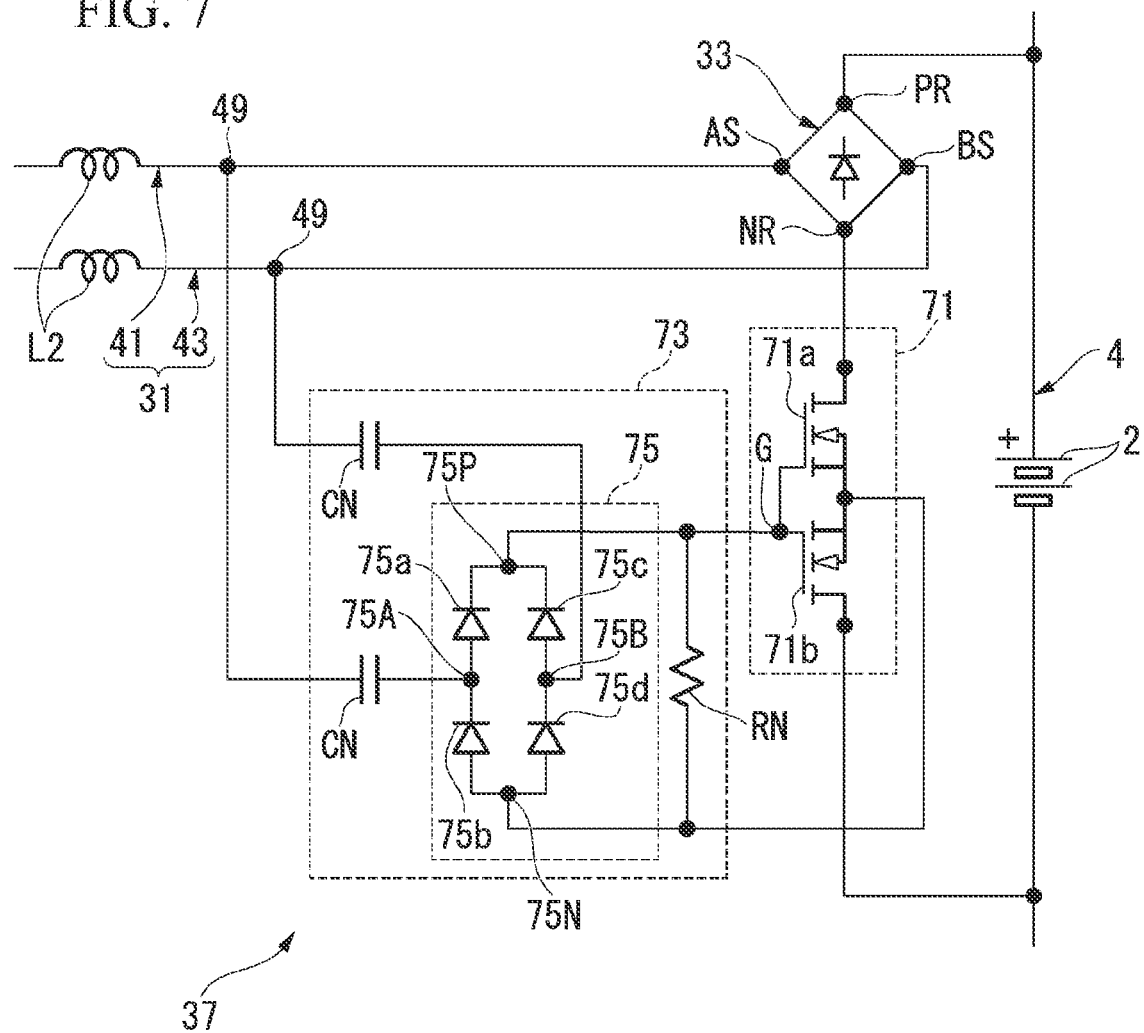
FIG. 7 is a diagram which shows a configuration of a negative electrode side current cutoff circuit of the charging system in the first modified example of the embodiment of the present invention.

FIG. 6 is a diagram which shows a configuration of a charging system 10A in a first modified example of the embodiment. FIG. 7 is a diagram which shows a configuration of a negative electrode side current cutoff circuit 37 of the charging system 10A in the first modified example of the embodiment.

As shown in FIG. 6, the charging system 10A in the first modified example includes an AC power source 11, a plurality of circuit modules 13A, and a control device 15. The plurality of circuit modules 13A are connected between the AC power source 11 and each of the plurality of battery modules 4. The number of the plurality of circuit modules 13A is the same as the number of the plurality of battery modules 4. The plurality of circuit modules 13A are, for example, a first circuit module 13Aa, a second circuit module 13Ab, a third circuit module 13Ac, and a fourth circuit module 13Ad.

Each of the plurality of circuit modules 13A includes an AC electric circuit 31, a rectifier circuit 33, and a negative electrode side current cutoff circuit 37. For example, the first circuit module 13Aa includes a first AC electric circuit 31a, a first rectifier circuit 33a, and a first negative electrode side current cutoff circuit 37a. The second circuit module 13Ab includes a second AC electric circuit 31b, a second rectifier circuit 33b, and a second negative electrode side current cutoff circuit 37b. The third circuit module 13Ac includes a third AC electric circuit 31c, a third rectifier circuit 33c, and a third negative electrode side current cutoff circuit 37c. The fourth circuit module 13Ad includes a fourth AC electric circuit 31d, a fourth rectifier circuit 33d, and a fourth negative electrode side current cutoff circuit 37d.

As shown in FIG. 7, each negative electrode side current cutoff circuit 37 of the plurality of circuit modules 13A is connected between the rectifier circuit 33 and the negative electrode end of a corresponding battery module 4 in the battery 1. The negative electrode side current cutoff circuit 37 includes a negative electrode side switch unit 71 and a negative electrode side switch drive unit 73.

The negative electrode side switch unit 71 is connected between the negative electrode terminal NR of the rectifier circuit 33 and the negative electrode end of a corresponding battery module 4 in the battery 1. The negative electrode side switch unit 71 is, for example, a bidirectional switch formed of two switching elements. The switching element is a transistor such as a MOSFET or an IGBT, and is, for example, an N channel-type MOSFET. Each transistor may include a rectifying element. The rectifying element is a diode connected in parallel to each transistor. The rectifying element is, for example, a freewheel diode that is connected between the drain and the source of the MOSFET in the forward direction from a source to a drain.

The negative electrode side switch unit 71 includes a negative electrode side first transistor 71a and a negative electrode side second transistor 71b connected in anti-series.

The gates G of the negative electrode side first transistor 71a and the negative electrode side second transistor 71b are connected to a positive electrode end of the negative electrode side switch drive unit 73 (for example, a connection point 75P of a negative electrode side rectifier circuit 75 to be described below). The sources of the negative electrode side first transistor 71a and the negative electrode side second transistor 71b are connected to a negative electrode end of the negative electrode side switch drive unit 73 (for example, a connection point 75N of the negative electrode side rectifier circuit 75 to be described below). A drain of the negative electrode side first transistor 71a is connected to the negative electrode terminal NR of the rectifier circuit 33. A drain of the negative electrode side second transistor 71b is connected to the negative electrode end of a corresponding battery module 4 in the battery 1.

The negative electrode side switch unit 71 switches between on (conduction) and off (cut off) of the negative electrode side first transistor 71a and negative electrode side second transistor 71b based on a gate signal, which is a switching command based on a voltage applied from the negative electrode side switch drive unit 73 between each gate and each source of the negative electrode side first transistor 71a and the negative electrode side second transistor 71b. The negative electrode side switch unit 71 switches between the conduction and the cut-off of a current between each battery module 4 and the rectifier circuit 33 according to on (conduction) or off (cut off) of the negative electrode side first transistor 71a and the negative electrode side second transistor 71b.

The negative electrode side switch drive unit 73 includes two negative electrode side capacitors CNs for DC insulation, a negative electrode side rectifier circuit 75, and a negative electrode side resistance RN for discharge.

The two negative electrode side capacitors CNs are connected to the second connection point 49 of each of the A-phase electric circuit 41 and the B-phase electric circuit 43 of the AC electric circuit 31.

The negative electrode side rectifier circuit 75 includes, for example, a bridge circuit formed of a plurality of diodes that are bridge-connected in two rows of the first row and the second row.

The negative electrode side rectifier circuit 75 is, for example, a full-wave rectifier circuit. The negative electrode side rectifier circuit 75 includes a negative electrode side first diode 75*a* and a negative electrode side second diode 75*b* connected in the forward direction in the first row, and a negative electrode side third diode 75*c* and a negative electrode side fourth diode 75*d* connected in the forward direction in the second row.

A connection point (an A-phase connection point) 75A between an anode of the negative electrode side first diode 75*a* and a cathode of the negative electrode side second diode 75*b* is connected to the second connection point 49 of the A-phase electric circuit 41 via the negative electrode side capacitor CN. A connection point (a B-phase connection point) 75B between an anode of the negative electrode side third diode 75*c* and a cathode of the negative electrode side fourth diode 75*d* is connected to the second connection point 49 of the B-phase electric circuit 43 via the negative electrode side capacitor CN.

A connection point 75P between cathodes of the negative electrode side first diode 75*a* and the negative electrode side third diode 75*c* is connected to the gate G of each of the transistors 71*a* and 71*b* of the negative electrode side switch unit 71. A connection point 75N between anodes of each of the negative electrode side second diode 75*b* and the negative electrode side fourth diode 75*d* is connected to the source of each of the transistors 71*a* and 71*b* of the negative electrode side switch unit 71.

The negative electrode side rectifier circuit 75 full-wave rectifies AC power input from the A-phase electric circuit 41 and the B-phase electric circuit 43 to the A-phase connection point 75A and the B-phase connection point 75B, and outputs the rectified DC power from the connection point 75P and the connection point 75N.

The negative electrode side resistance RN is connected between the connection point 75P and the connection point 75N of the negative electrode side rectifier circuit 75.

The negative electrode side switch drive unit 73 automatically switches between the conduction and cut-off of a current of the negative electrode side switch unit 71 according to AC power input from the A-phase electric circuit 41 and the B-phase electric circuit 43 to the rectifier circuit 33.

SECOND MODIFIED EXAMPLE

In the embodiment or the first modified example described above, each of the plurality of circuit modules 13 includes a positive electrode side current cutoff circuit 35 or a negative electrode side current cutoff circuit 37 between the rectifier circuit 33 and the positive electrode end or the negative electrode end of the battery module 4, but the present invention is not limited to this.

Figure 8:
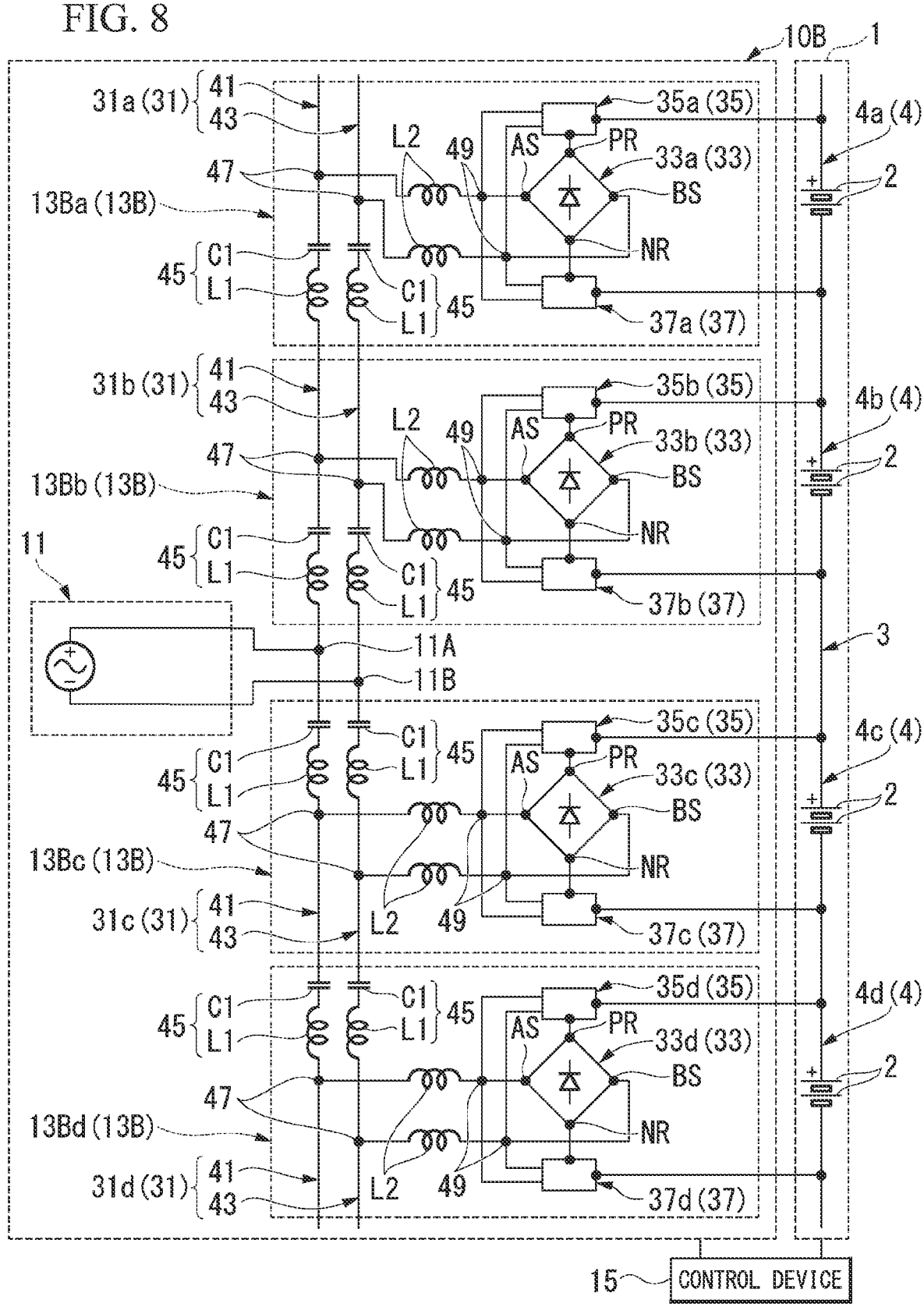
FIG. 8 is a diagram which shows a configuration of a charging system in a second modified example of the embodiment of the present invention.
Figure 9:
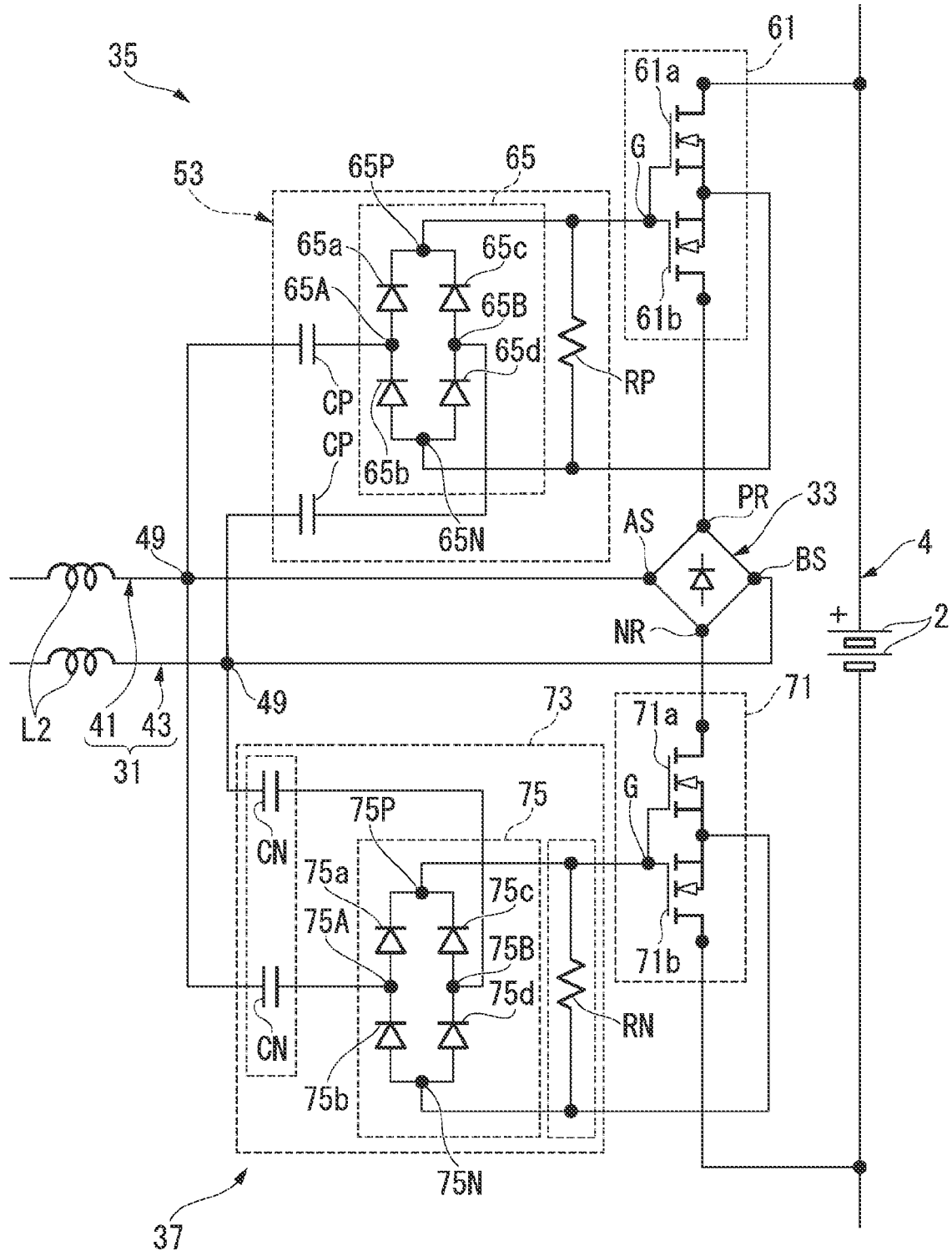
FIG. 9 is a diagram which shows a configuration of a positive electrode side current cutoff circuit and a negative electrode side current cutoff circuit of the charging system in the second modified example of the embodiment of the present invention.

FIG. 8 is a diagram which shows a configuration of a charging system 10B in a second modified example of the embodiment. FIG. 9 is a diagram which shows a configurations of the positive electrode side current cutoff circuit 35 and the negative electrode side current cutoff circuit 37 of the charging system 10B in the second modified example of the embodiment.

As shown in FIGS. 8 and 9, the charging system 10B in the second modified example includes an AC power source 11, a plurality of circuit modules 13B, and a control device 15. The plurality of circuit modules 13B are connected between the AC power source 11 and each of the plurality of battery modules 4. The number of the plurality of circuit modules 13B is the same as the number of the plurality of battery modules 4. The plurality of circuit modules 13B are, for example, a first circuit module 13Ba, a second circuit module 13Bb, a third circuit module 13Bc, and a fourth circuit module 13Bd. Each of the plurality of circuit modules 13B includes an AC electric circuit 31, a rectifier circuit 33, a positive electrode side current cutoff circuit 35, and a negative electrode side current cutoff circuit 37. For example, the first circuit module 13Ba includes a first AC electric circuit 31*a*, a first rectifier circuit 33*a*, a first positive electrode side current cutoff circuit 35*a*, and a first negative electrode side current cutoff circuit 37*a*. The second circuit module 13Bb includes a second AC electric circuit 31*b*, a second rectifier circuit 33*b*, a second positive electrode side current cutoff circuit 35*b*, and a second negative electrode side current cutoff circuit 37*b*. The third circuit module 13Bc includes a third AC electric circuit 31*c*, a third rectifier circuit 33*c*, a third positive electrode side current cutoff circuit 35*c*, and a third negative electrode side current cutoff circuit 37*c*. The fourth circuit module 13Bd includes a fourth AC electric circuit 31*d*, a fourth rectifier circuit 33*d*, a fourth positive electrode side current cutoff circuit 35*d*, and a fourth negative electrode side current cutoff circuit 37*d*.

THIRD MODIFIED EXAMPLE

In the embodiment described above, each positive electrode side current cutoff circuit 35 of the plurality of circuit modules 13 includes a bridge circuit formed of a plurality of diodes, but the present invention is not limited to this, and may include other rectifier circuits.

Figure 10:
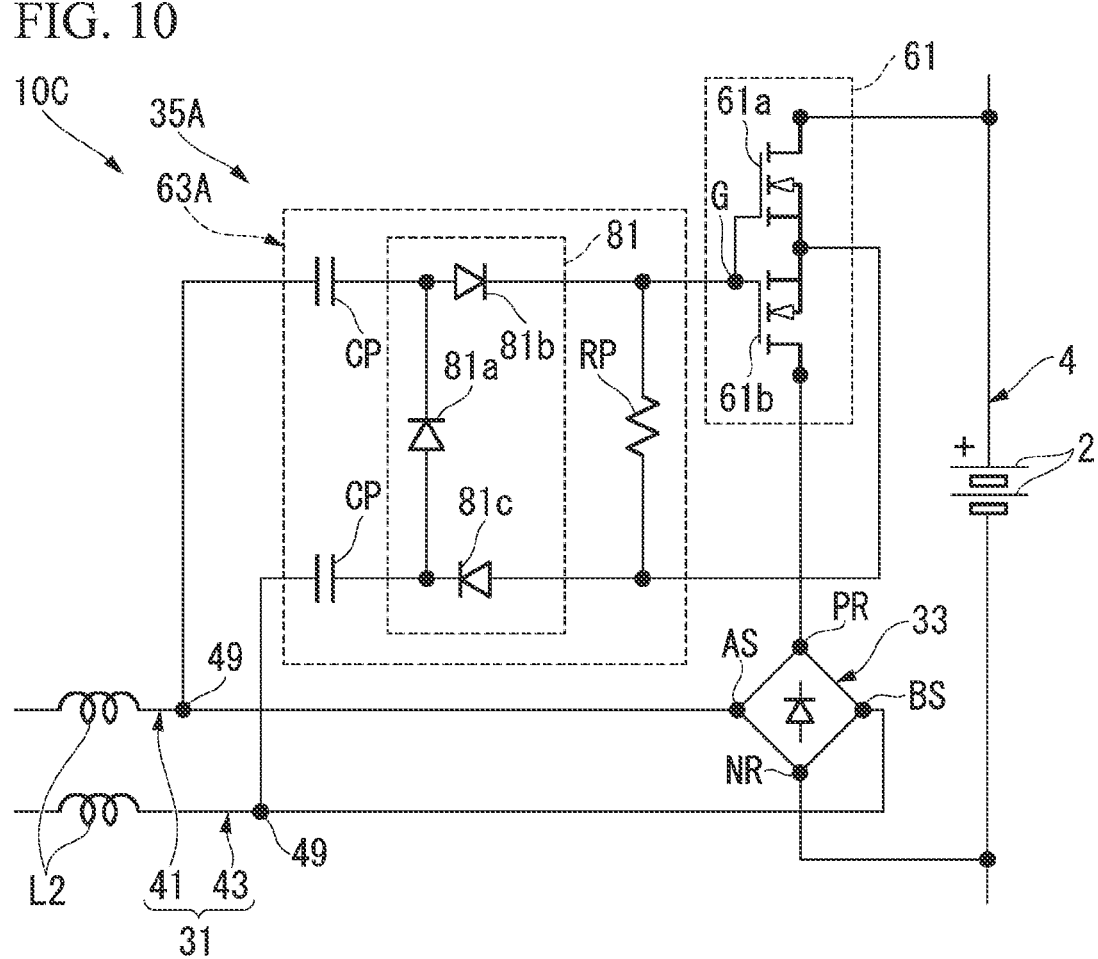
FIG. 10 is a diagram which shows a configuration of a positive electrode side current cutoff circuit of a charging system in a third modified example of the embodiment of the present invention.

FIG. 10 is a diagram which shows a configuration of a positive electrode side current cutoff circuit 35A of a charging system 10C in a third modified example of the embodiment.

As shown in FIG. 10, the positive electrode side current cutoff circuit 35A of the charging system 10C in the third modified example includes a positive electrode side switch unit 61 and a positive electrode side switch drive unit 63A. The positive electrode side switch drive unit 63A includes two negative electrode side capacitors CNs for DC insulation, a positive electrode side rectifier circuit 81, and a positive electrode side resistor RP for discharge.

The positive electrode side rectifier circuit 81 includes, for example, a first diode 81*a*, a second diode 81*b*, and a third diode 81*c*.

A cathode of the first diode 81*a* is connected to the positive electrode side capacitor CP on an A-phase side, and an anode of the first diode 81*a* is connected to the positive electrode side capacitor CP on a B-phase side.

A cathode of the second diode 81*b* is connected to the gate G of each of the transistors 61*a* and 61*b* of the positive electrode side switch unit 61, and an anode of the second diode 81*b* is connected to the cathode of the first diode 81*a*.

A cathode of the third diode 81*c* is connected to the anode of the first diode 81*a*, and an anode of the third diode 81*c* is connected to the source of each of the transistors 61*a* and 61*b* of the positive electrode side switch unit 61.

In the embodiment described above, it is described that the first power conversion unit 22 performs two types of power conversion of step-up and step-down, but the present invention is not limited to this, and may include a step-up circuit or a step-down circuit.

In the embodiment described above, the charging system 10 is mounted in a vehicle, but the present invention is not limited to this, and the charging system 10 may be mounted in other devices.

In the embodiment described above, the charging system 10 is connected to a power storage device, but the present invention is not limited to this, and the charging system 10 may be connected to another load to supply power.

The embodiment of the present invention is presented as an example, and is not intended to limit the scope of the invention. These embodiments can be implemented in various other forms, and various omissions, replacements, and changes can be made within a range not departing from the gist of the invention. These embodiments and modified examples thereof are included in the scope and gist of the invention, as well as in the invention described in the scope of the claims and the equivalent scope thereof.

What is claimed is:

1. A charging system that charges a plurality of power storage modules that form a power storage device, comprising:
    an AC power source;
    a plurality of rectifiers that are connected between the AC power source and each of the plurality of power storage modules, and supply DC power obtained by rectifying AC power supplied from the AC power source to the plurality of power storage modules; and
    a plurality of current cutoff units that are connected between each of the plurality of power storage modules and each of the plurality of rectifiers, and automatically switch between conduction and cutoff of a current between the plurality of power storage modules and the plurality of rectifiers according to the AC power input to each of the plurality of rectifiers,
    wherein each of the plurality of current cutoff units includes
        a switch unit that is connected between the power storage module and the rectifier and includes at least one switching element, and
        a drive unit that is connected between an AC input end of the rectifier and a control terminal of the switch unit and generates a control signal for switching between closing and opening of the switch unit according to the AC power input to the AC input end, and
    wherein the drive unit includes
        a capacitor connected to the AC input end,
        a rectifier circuit connected to the capacitor, and
        a discharge resistor connected between the rectifier circuit and the switch unit.

2. The charging system according to claim 1,
    wherein the switching element is a transistor, and
    wherein, in the drive unit,
        when the AC power is not supplied from the AC power source,
            the discharge resistor discharges charge between a gate and a source of the transistor, and thereby the transistor is put into a cut-off state, and
            a leakage current of the power storage module via the rectifier circuit becomes small, and
        when the AC power is supplied from the AC power source,
            only an AC component is input to the rectifier circuit via the capacitor, capacitance between the gate and the source of the transistor is charged with a DC power rectified by the rectifier circuit, and a gate-source potential becomes high, and thereby the transistor is conduced, and
            the DC power generated by the rectifier circuit is used to charge the power storage module.

* * * * *